United States Patent [19]

Murphy

[11] Patent Number: 4,789,503

[45] Date of Patent: Dec. 6, 1988

[54] AIR REMOVAL SNORKEL DEVICE

[75] Inventor: Declan Murphy, Quebec, Canada

[73] Assignee: Atara Corporation, Quebec, Canada

[21] Appl. No.: 62,094

[22] Filed: Jun. 15, 1987

[51] Int. Cl.$^4$ ................................................ B01F 3/04
[52] U.S. Cl. ...................................... 261/77; 55/256; 55/461; 55/257.5; 55/257.1
[58] Field of Search ............ 261/77, 120; 55/257 MP, 55/256, 257 R, 461, 192, 193

[56] References Cited

U.S. PATENT DOCUMENTS

| | | | |
|---|---|---|---|
| 1,508,399 | 9/1924 | Kohut | 55/257 MP |
| 1,818,367 | 8/1931 | Wallace | 55/461 |
| 3,246,761 | 4/1966 | Bryan et al. | |
| 3,365,178 | 1/1968 | Bood | 261/120 |
| 3,546,851 | 12/1970 | Hardison et al. | 55/257 MP |
| 3,592,450 | 7/1971 | Rippon | |
| 3,628,775 | 12/1971 | McConnell et al. | |
| 3,794,303 | 2/1974 | Hirshorn | 261/77 |
| 4,107,240 | 8/1978 | Verner et al. | 261/77 |
| 4,138,335 | 2/1979 | Murphy | |
| 4,169,873 | 10/1979 | Lipert | |
| 4,187,263 | 2/1980 | Lipert | |
| 4,293,506 | 10/1981 | Lipert | |
| 4,448,135 | 5/1984 | Dougan et al. | 55/461 |
| 4,486,361 | 12/1984 | Durot et al. | |
| 4,514,343 | 4/1985 | Cramer et al. | 261/120 |
| 4,569,804 | 2/1986 | Murphy | 261/123 |
| 4,587,064 | 5/1986 | Blum | 261/120 |

OTHER PUBLICATIONS

Pierce, Floating Draft Tube Aerator, Water Pollution Control Federation Highlights, 2–76, vol. 13, No. 2, p. 7.

Primary Examiner—Tim Miles
Attorney, Agent, or Firm—McAulay, Fields, Fisher, Goldstein & Nissen

[57] ABSTRACT

This invention provides apparatus for creating circulation of liquid in a vertical direction within a standing body of such liquid, using a gas bubble generator, without creating excessive turbulence at the surface of the liquid, thus avoiding the formation of foam. A preferred embodiment of this apparatus provides for a vertically extending stackpipe, a gas bubble generator at a lower portion of the stackpipe and means for delivering gas bubbles under pressure to the stackpipe, and, at the upper portion of the stackpipe adjacent the upper discharge opening, means designed to laterally divert a flow of liquid and entrained gas bubbles into a substantially horizontal direction, to cause separation of the gas and liquid and to discharge the gas to a location above the level of the surface of the body of liquid.

15 Claims, 4 Drawing Sheets

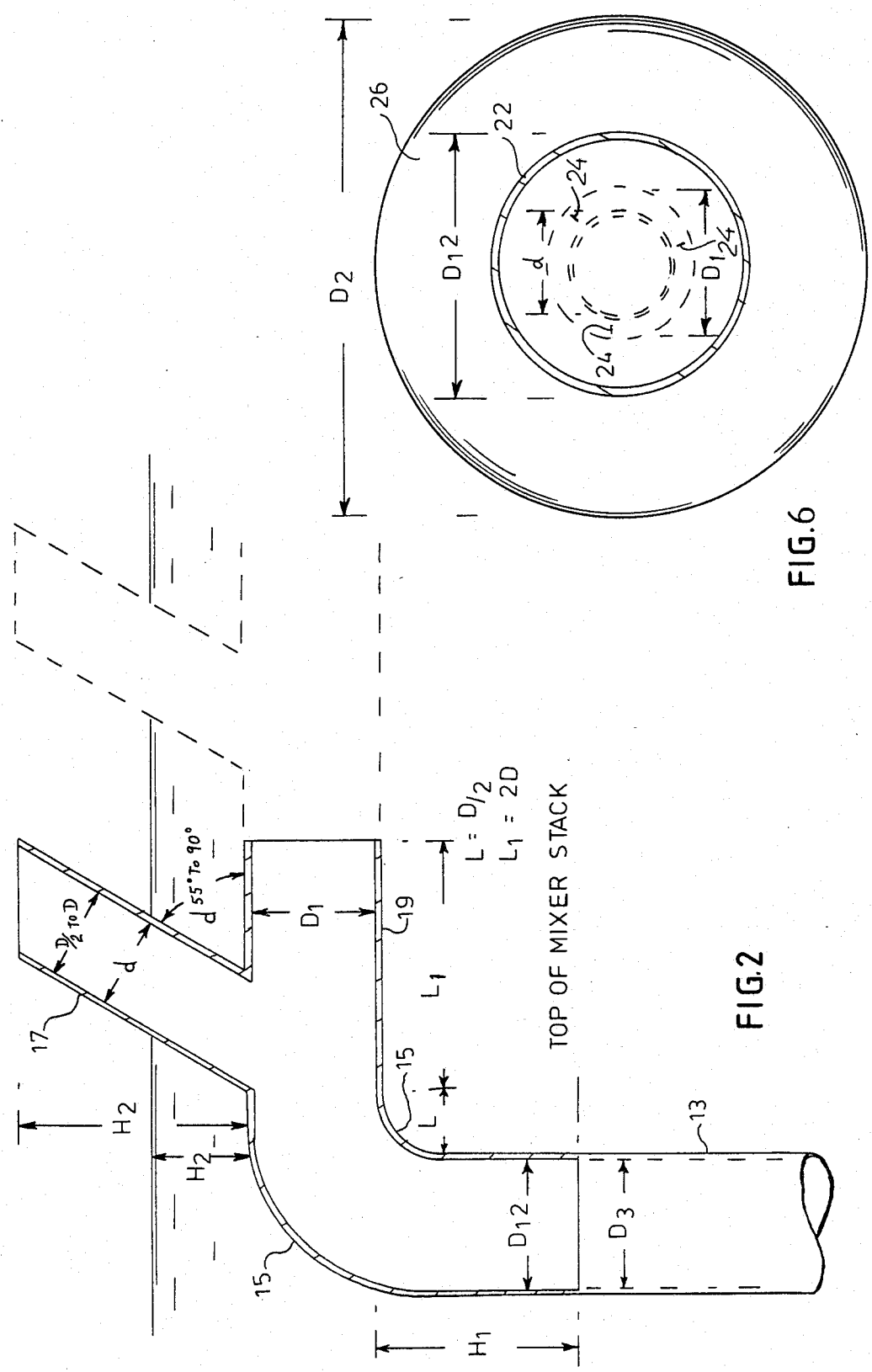

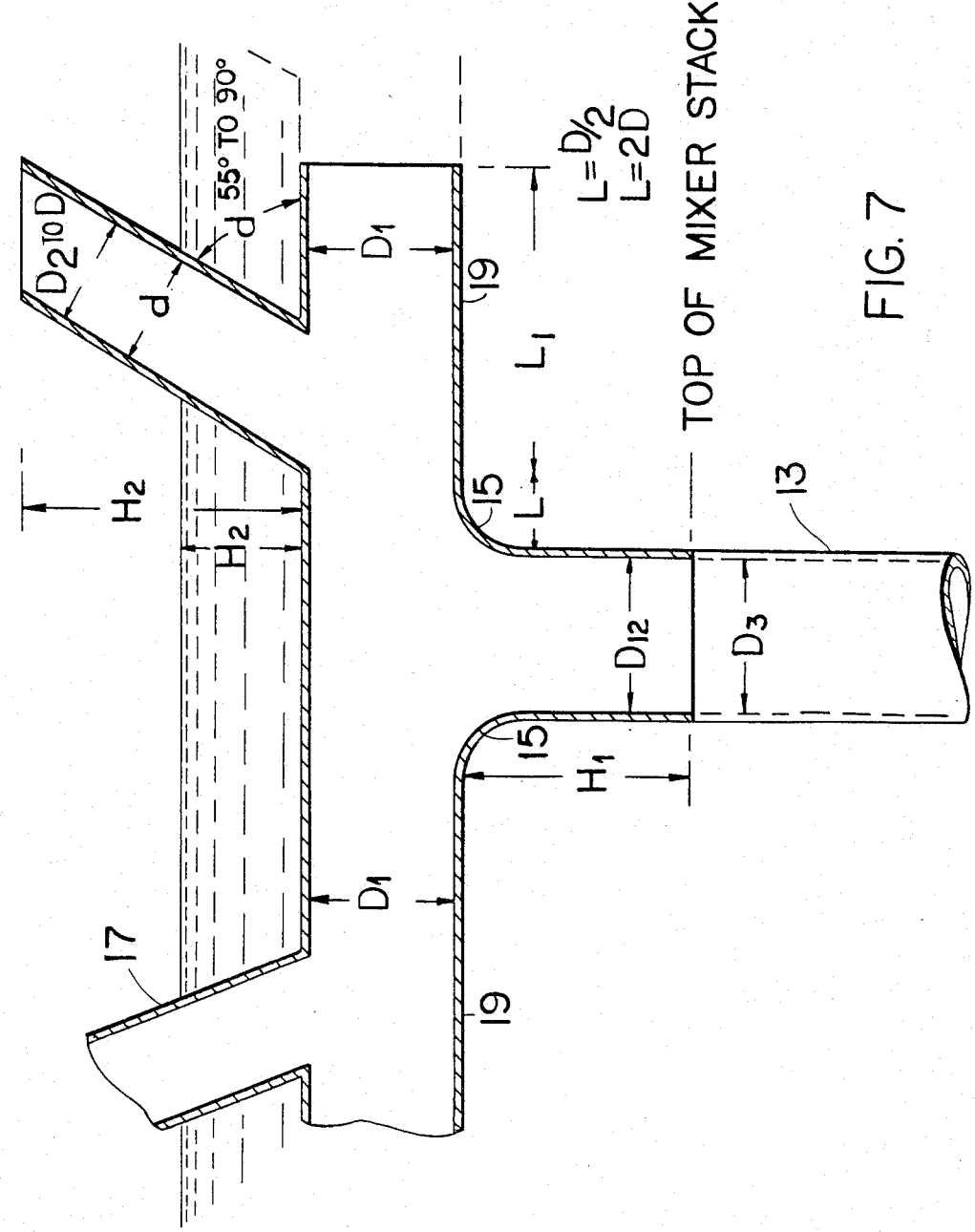

AIR REMOVAL SNORKEL DEVICE

This invention relates generally to improvements in the apparatus for creating circulation, using gas entrainment methods, i large standing bodies of liquids. It is more particularly related to efficient liquid flow generation in such large standing bodies of liquid while minimizing any surface foaming and/or absorption, or dissolving, of entrained gases into the liquid.

There are many procedures that require the maintenance of a substantial circulating flow of liquids in large standing bodies of such liquids, sometimes with concurrent heating or cooling for controlling the temperature of the body of liquids. It is generally preferable to maintain a continuing vertical circulating flow of the liquid, between the bottom and the top of the liquid, in order to improve uniformity of temperature and/or of concentration of the liquid. The presence of a solid phase or of an especially adherent and immiscible liquid phase, generally necessitates the use of a gas entrainment method for creating the flow of liquid without moving mechanical parts. Many of the solid or adherent liquid components may foul a mechanical mixing means, or may be undesirably changed by contact with a mechanical mixer.

Such mixtures often require the use of relatively large conduits for liquid flow in order to avoid blockage or other interference with the flow. In such cases, reliability, ease of servicing and maintenance, and the avoidance of interference with the chemical or biological processing of the liquid, or the materials in the liquid, become of paramount importance.

To achieve these aims, the gas entrainment methods of flow generation have been utilized. These include the so-called large bubble generators as described, for example, in U.S. Pat. Nos. 3,592,450 to Rippon, 3,628,775 to McConnell, and 3,246,761 to Bryan et al. In general, these devices include a gas bubble generator, comprising a gas accumulator tank and an inverted siphon connecting the tank to a vertically rising stackpipe, the stackpipe extending up through the standing body of liquid and generally terminating at a point below the surface of the liquid. See also, for example, U.S. Pat. Nos. 4,169,873, 4,187,263, and 4,293,506, all to Lipert. In several instances, where it was desired to disperse the large air bubbles prior to reaching the surface, a cap was placed a short distance above the top of the stackpipe so as to disperse outwardly the liquid and simultaneously to break up the air bubbles. See for example, U.S. Pat. No. 4,138,335 to Lipert and U.S. Pat. No. 4,486,361 to Degremont.

The circulating flow of liquid can also be generated by utilizing a myriad of small gas bubbles injected into the stackpipe to provide the vertical motion. The stackpipe terminates at a point below the surface of the liquid, in order to avoid an undesirably high liquid head which would significantly reduce liquid circulation.

Situations often arise where the conditions of the materials in the standing body of liquid require the substantial elimination of surface foaming and, in some cases, the elimination or at least substantial reduction of the absorption into the body of liquid of the entrained air.

It is thus an object of the present invention to provide for the suitable circulating flow of liquid in large standing bodies of such liquid without mechanical moving parts, while avoiding the surface turbulence usually created by the injection of entrained gases. It is a further object of this invention to also reduce the absorption of the entrained gas into the circulating liquid, without significantly reducing the vertical lifting efficiency of such liquid gas-lift devices. These and other objects of the present invention are provided by the present invention by sharply diverting the circulating vertical flow of liquid and gas to a horizontal direction, and removing the entrained gas prior to its reaching the surface of the liquid so as to exhaust the gas into a gas-filled space above the top surface of the standing body of liquid.

In accordance with the present invention, apparatus is provided for creating circulation within a body of liquid, the apparatus comprising a substantially linearly extending stackpipe having a substantially constant nominal internal diameter ("D") and designed to be submerged within the body of liquid, the stackpipe having a lower inlet opening and an upper discharge opening; flow generating means comprising a gas bubble generator in fluid flow connection with the interior of the stackpipe and means for delivering gas under pressure to the gas bubble generator; the improvement in this apparatus comprises diversion means in fluid flow connection with the upper discharge opening of the stackpipe and designed to laterally divert a flow of liquid and entrained gas bubbles out through the upper discharge opening and into a substantially horizontal direction; flow limiting means designed to prevent the liquid and gas bubble flow from reaching the surface of the body of liquid; and gas collecting and discharging means, in fluid flow connection with the flow limiting means and designed to collect and discharge the entrained gas bubbles to a space above the body of liquid, the collecting means comprising an inlet opening located below the surface of the body of liquid and a discharge opening located above the surface of the body of liquid.

Utilizing the present invention in combination with gas entrainment liquid circulating means, substantially reduces or eliminates surface turbulence which is a major factor in the creation of foam and further limits the amount of gas transferred into or absorbed by the standing body of liquid. The present invention is applicable to both the large bubble type of flow generators and to continuous small bubble gas lift devices.

The diversion means can provide for diverting the flow in a single direction, as through a single conduit extending in a horizontal direction, or diverting the flow in a spread, or 360°, pattern, where the flow extends outwardly in substantially all directions beneath a horizontally extending surface. Intermediate types of diversion means provide two or more conduits which extend substantially horizontally outwardly from the vertical stackpipe and in opposing directions. The gas discharging means must effectively be offset from the main vertical flow of liquid through the stackpipe, so as to provide for at least a minimum horizontal flow distance to permit the vertical discharge of gas into a collecting conduit without a concomitant vertical flow of the liquid to a location above the surface of the stand body of liquid.

The diversion means preferably extends at least a distance of one-half the stackpipe diameter ("D/2")) beyond the interior edge of the vertical stackpipe. The diverter must direct the flow in a horizontal direction for a distance sufficient to permit the separation of the entrained gas bubbles from the liquid so as to permit vertical discharge of the gas without significantly increasing the height of the liquid head through the discharge means. This can be accomplished by two types of apparatus; first, providing for one or more discrete horizontal conduits extending outwardly from the vertical stackpipe, or second, providing a substantially horizontal flow-spreader plate above an open-ended stackpipe, for discharging the gas and liquid into the surrounding body of liquid, and an annular, larger diameter plate directly above for funnelling gas to above the liquid surface while maintaining a predominantly horizontal flow of liquid and preventing the vertical flow of the gas and liquid upwardly directly to the surface of the body of liquid.

The various features and advantages of the present invention will become more apparent from the accompanying drawings and the following verbal description of the preferred embodiments of the present invention. The descriptions and drawings, and the following examples, merely are intended to exemplify the invention and are not intended to be exclusive of the scope thereof. The drawings are in many cases representative rather than detailed, and where specific details are not shown it is anticipiated that means well known to the art can be used to provide the desired function. The materials of construction and ancillary devices referred to in the text are similarly well known in the art and include those generally used, unless expressly stated otherwise.

Referring to the drawings,

FIG. 2 is a diagrammatic elevation sketch showing in closeup the upper end of the stackpipe and the horizontal conduit and snorkel in accordance with the present invention;

FIG. 6 is a cross-sectional view taken along lines 6—6 of FIG. 4 and

FIG. 7 is a diagrammatic elevation sketch showing in closeup the upper end of the stackpipe and including twin horizontal conduits and snorkels, in accordance with the present invention.

Figure 1:
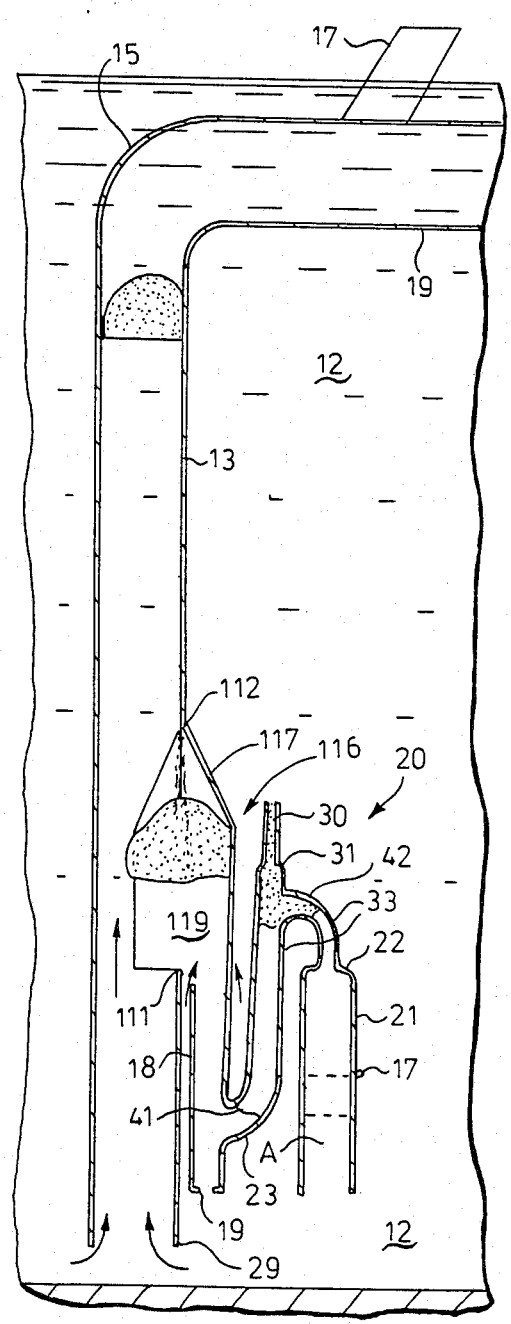
FIG. 1 is a diagrammatic elevation sketch of a preferred example of a large bubble, or cannon, type of flow generator, including a stackpipe and horizontal flow diverter in accordance with the present invention.

FIG. 1 shows one embodiment of the present invention, by way of example, completely submerged in a standing body of liquid 12, generally located within a very large tank, having a diameter at least about 5 times the diameter of the stackpipe 13. A large bubble generator 20 is disposed at the lower end of a stackpipe 13, generating and feeding large bubbles through a lateral opening 116 into the stackpipe 13. The detail of the generator and of the lateral opening are not critical to this invention, and are shown in U.S. Pat. No. 4,569,804.

Connected directly onto and connecting above the top of the stackpipe 13 is a diverter conduit 15, having substantially the same, but possibly slightly reduced or enlarged internal diameter.

The diverter conduit 15 extends along a substantially right angle bend and is directly connected into the limiting conduit 19, having substantially the same internal diameter and extending in a horizontal direction. Extending upwardly from the upper portion of the limiting conduit 19 and adapted to extend to a position above the top surface of the standing body of liquid 12 is a gas release pipe or snorkel 17. The snorkel 17 extends upwardly from the limiting conduit 19 at an angle α, generally equal to at least 45° and preferably up to 90° from the horizontal. The diameter of the snorkel discharge pipe 17 ("d") is at least about one-half the diameter of the stackpipe ("D/2") and preferably not greater than about the diameter of the stackpipe. The offset horizontal distance ("L") between the downstream edge of the stackpipe 13 and the upstream edge of the snorkel pipe 17 is at least about D/2, and most preferably not greater than about 3D/2. The distance ("L1") from the downstream edge of the snorkel 17 to the end of the limiting conduit 19 is at least about 2D.

The tops of the diverter conduit 15 and limiting conduiting 19 must be below the level of the surface of the standing body of liquid, and the vertical height ("H₂") the discharge snorkel 17 is equal to at least about the diameter of the snorkel ("d") and is preferably not greater than about 7d.

If it is desired to exhaust a greater amount of the air from the liquid stack before discharging into the standing body of liquid, it is possible to extend the length of the limiting conduit 19 and to provide additional vertical discharge snorkels, extending upwardly therefrom at the angle α, as defined above. Preferably, no more than two such snorkels, are generally useful or needed. Further, the diverter bend 15 can be greater than 90°, by a small amount, e.g., about 90° to about 94°. to give a slight downward tilt to the limiting conduit 19.

Although the conduits shown are generally cylindrical, or of circular cross-section, it is within the scope of this invention to use conduits having other cross-sections including those which are polygonal, e.g., squares or rectangles, as well as others which are curvilinear, e.g., ovoid.

Figure 4:
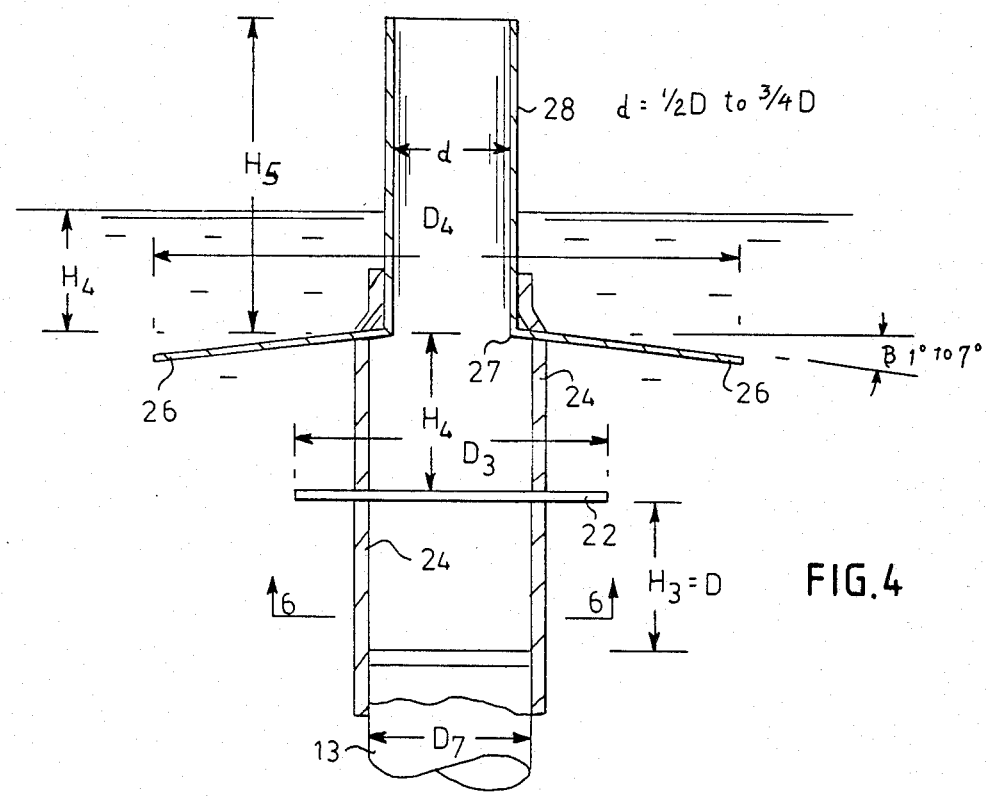
FIG. 4 is a diagrammatic elevation sketch of a second, spreader plate embodiment in accordance with the present invention.
Figure 5:
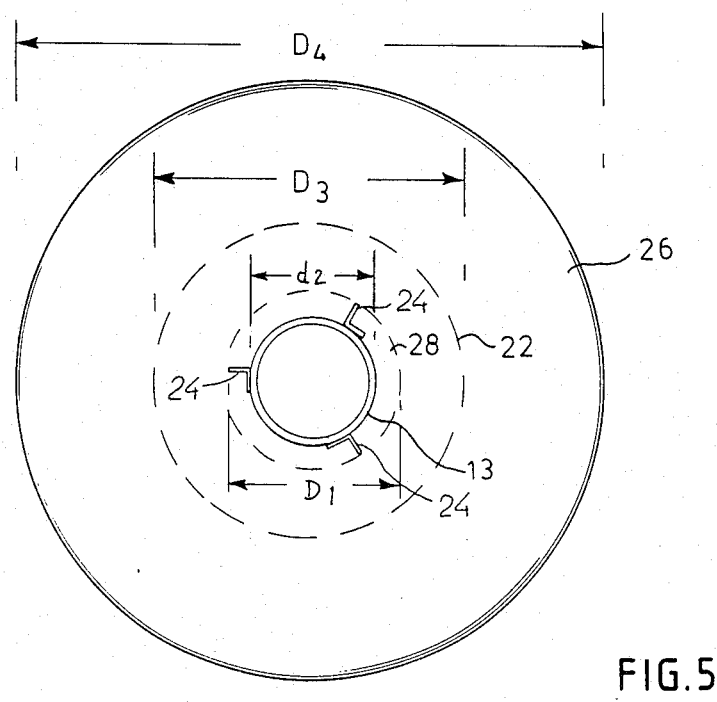
FIG. 5 is a plan view looking downwardly of the vertical snorkel embodiment of this invention.

Referring to FIGS. 4 through 6, a spreader plate embodiment is described wherein the flow is diverted over substantially a full 360° at the top of the stackpipe. In this embodiment, a framework comprising a series of support legs 24 rests at the top of the stackpipe 13 and supports from a central portion thereof a substantially circular, solid spreader plate 22 concentric with the stackpipe 13, but having a diameter ("D₃") equal preferably to at least about twice the stackpipe diameter, i.e., 2D and extending substantially horizontally across and above (a distance H₃) the top of the stackpipe 13. Above the spreader plate 22, (a distance "H₄") is an annular collection hood 26 and a central snorkel 28 also secured to the framework of support legs 24. The snorkel pipe 28 and collection hood 26 are both substantially concentric with the spreader plate 22 and the stackpipe 13.

The hood 26 comprises an annular portion extending outwardly beyond the flow spreader plate to a diameter ("D₄") equal to at least about twice that of the spreader plate ("2D₃"). The collection hood 26 preferably is slightly conical, diverging downwardly from the snorkel pipe 22 at a slightly angle ("β") equal preferably to not greater than about 7°.

The snorkel pipe 28 also preferably has a diameter at least equal to about one-half of the stackpipe diameter ("D/2"), and most preferably of not greater than about 3D/4.

The height H₃ of the spreader plate 22 above the top of the stack 13 is preferably equal to at least about the internal diameter of the stack, and the vertical distance between the spreader plate 22 and the inner edge 27 of the collection hood 26 is also equal to at least about the diameter of the stackpipe. The bottom of the snorkel 28 and the top of the collection hood 26 are preferably below the top of the liquid level of the standing body of liquid 12 and the snorkel pipe 28 extends a distance equal to at least the diameter of the stackpipe above the collection hood 26, to a point above the liquid level.

Most preferably the snorkel pipe 28 does not have a height greater than about 7 times its own diameter ("7d"), but must extend above the surface of the liquid. As shown in the embodiment of FIGS. 4 through 6, there are three support legs 24 distributed equally around the circumference of the stackpipe supporting the flow spreader plate 22 and the collection hood 26 and snorkel 28. The openings between the support legs 24 permit lateral outward flow from the top of the stackpipe 13 and back to the snorkel 28. It is, of course, within the scope of this invention to have only two, or more than three, support legs and the conduits may have a polygonal rather than a circular cross-section.

In normal operations of a liquid flow generator of the present type, the stackpipe and the large bubble generator are designed to be fully submerged in a large body of liquid. The stackpipe is generally vertical and has a substantially constant cross-section. The bottom of the stackpipe is preferably at least about one diameter ("D") above the floor of the tank or other fluid container and preferably not more than about 4D above the bottom floor.

The liquid flow generating means whether a large bubble generator or a continuous small bubble generator injects gas into the lower portion of the stackpipe. In the case of a large bubble generator, it has been found preferable to generate the bubble slightly above the bottom inlet to the stackpipe.

In large bubble generator systems, a discontinuous series of large bubbles are generated, each bubble preferably extends across substantially the full cross-section of the stackpipe as it rises upwardly, acting much in the way of a piston pushing the liquid before it, and thus providing the desired circulation from the bottom of the stackpipe upwardly and out the top of the stackpipe.

In the case of the present invention, the normally straight stackpipe can be modified so as to prevent the evolution of gas bubbles to the liquid surface, without unduly decreasing or diminishing the efficiency of the liquid flow generation and thus of the mixing effect throughout the large liquid body. In some case, it has been found undesirable to have the turbulence created at the surface of the liquid as the bubbles break on breaching the top surface. Such turbulence in many types of liquids involved in, e.g., sewage treatment or other chemical operations, will create undesirably long-lasting foam at the top of the liquid surface. Such foam can interfere with the activity of the liquid and can also produce undesirable expansion at the upper level of the tank.

In order to avoid such undesirable foaming, the invention provides means to release the entrained gas prior to the flowing stream of liquid reaching the liquid surface; the gas separately passes to a point above the surface of the liquid and the liquid is deflected horizontally without unduly restricting the overall mixing effect. It has been found possible to do this by deflecting the vertical flow at the top of the stackpipe and providing for separation of the gas and expelling the gas-depleted liquid at a point just slightly below the top surface.

Figure 3:
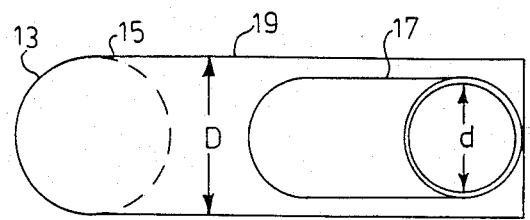
FIG. 3 is a plan view looking downwardly of the embodiment of FIG. 2.

In accordance with the device of FIGS. 2 and 3, the liquid is forced around a substantially right angle or 90° bend 15 in a pipe extending immediately from the stackpipe 13, and caused to flow in a horizontal direction. As the liquid flows through the flow-limiting pipe 19 in a horizontal direction, the gas continues to move upwardly and coalesce along the upper portion of the deflector pipe 15 and the flow-limiting pipe 19. The gas is then released upwardly through the snorkel pipe 17 and expelled into the atmosphere above the top level of the liquid 12. In the meantime, liquid flow continues in the horizontal direction until it is ultimately discharged through the outlet from the flow-limiting pipe 19, thus continuing to contribute to the desirable mixing in the tank.

It has surprisingly been found that the amount of mixing which is obtained is substantially only slightly diminished by virtue of this diversion of the flow, because the horizontal flow is itself far more efficient to obtain mixing than would be a direct vertical flow outwardly from the top of the vertical stackpipe 13. It has also surprisingly been found that the efficiency of the flow generation is not greatly reduced.

As shown by the alternative embodiment of FIGS. 4-6, multiple deflector pipes and flow-limiting pipes can be utilized, as by using a T-joint or a joint having more than two horizontal pipes to provide flow in more than a single horizontal direction. Similarly, where unusually large amounts of gas are present, or the liquid is exceptionally susceptible to foaming, more than one snorkel pipe 17 can be provided along each extended horizontal flow-limiting pipe 19.

As a further alternative, a fully 360° horizontal flow can be provided by the use of the spreader plate 22 of FIGS. 4, 5 and 6. In this embodiment, the vertically flowing liquid through the stackpipe 13 impinges upon the bottom surface of the substantially horizontal, solid flow spreader plate 22 causing the liquid to move outwardly in a horizontal direction together with the entrained gas. The entrained gas, however, continues to move upwardly as the flow extends beyond the outer circumference of the plate 22 and moves upwardly to be collected under the air collection hood 26.

The air collection hood 26 has a slight downward divergence and thus provides means for the gas to continue to move upwardly and inwardly along the surface of the hood 26 until it reaches the central open portion; the gas moves upwardly through the snorkel pipe 28 to be released into the atmosphere above the top surface of the liquid. By this means, a full 360° diversion of the liquid is provided in a horizontal directon and removal of the air from the liquid is successfully provided. In this embodiment, the air removal snorkel pipe 28 is effectively offset from the direct vertical flow in the stackpipe 13, by the diverter plate 22, in order to provide a finite time for the gas to separate from the horizontally flowing liquid.

The efficiency drop with respect to flow generation is limited to between 5 and 20% by these systems. Both of the above embodiments are effective in substantially eliminating surface turbulence and, therefore, foaming action. However, the use of the deflector pipes to carry the flow in a horizontal direction is somewhat more effective in removing the entrained air, albeit at a slightly greater loss in flow efficiency.

The following mathematical relationships set forth the preferred relative values for the length, diameters and angles in the present invention. Referring first to the embodiment of FIGS. 2 and 3, the preferred relationships are as follows:

$L = D/2$ to $3D$;
$L_1 = 2D$ to $5D$;
$d = D/2$ to $D$;
$D_1 = D$; and
Angle $\alpha = 45°$ to $90°$.

Referring to the embodiment of FIGS. 4, 5 and 6,:
$D_3$ (diameter of flow spreader plate) = $1.5D$ to $3D$;
$D_4$ (diameter of collection hood) = $1.5D_3$ to o $3D_3$;
$H_3$ (vertical distance from top of stackpipe to flow spreader plate) = $D$ to $2D$;
$H_4$ (distance between flow spreader plate and center of air collection hood) = $D$ to $2D$;
Angle $\beta = 1°$ to $10°$;
$H_5$ (distance from top of air collection hood to top of snorkel release pipe) = $d$ to $7d$; and
$d_1$ (diameter of snorkel release pipe) = $\frac{1}{2}D$ to $\frac{3}{4}D$.

The following examples provide actual measurements of working devices in accordance with the embodiments of the present invention. These embodiments are intended merely to exemplify advantageous constructions under the invention, but are not intended to be exclusive thereof.

EXAMPLE 1

Referring to the construction of FIGS. 2 and 3, the stackpipe having a diameter of 12 inches is connected through a 90° bend to a horizontal pipe having the same diameter ($D_1 = 12$ inches). Beginning at a point offset by 6 inches (L) from the inner edge of the stackpipe is a slanted vertical riser pipe having a diameter (d) of about 9 inches, extending to above the water level of the sewage treatment tank from the top of the horizontal pipe a distance of 36 inches ($H_2$). The total length ("$L_1$") of the horizontal deflector pipe from the upstream edge of the snorkel is about 24 inches. The snorkel pipe is slanted upwardly at an angle of 55° above the horizontal.

The above apparatus was found to be especially effective in preventing the absorption of oxygen into anaerobic sewage treatment plant water where air was the flow-generating gas. The device substantially completely eliminated surface turbulence and thus foaming at the top surface of the liquid.

EXAMPLE 2

Referring to the embodiment of FIGS. 4, 5 and 6, the stackpipe also had a diameter (D) of 12 inches; the diameter of the flow spreader plate (D1) equaled 24 inches. The diameter of the collection hood (D2) equaled 48 inches and the height ($H_3$ and $H_4$) from the stackpipe to the spreader plate and from the spreader plate to the collection hood both equaled 12 inches. The height ($H_5$) to the top of the snorkel above the center of the collection hood was 36 inches, the snorkel having an internal diameter (d) of 9 inches. The snorkel extended above the surface of the liquid and the collection hood was fully submerged under the liquid.

The above device was especially effective in preventing turbulence and thus foam at the surface of a sewage treatment tank wherein the flow-generating gas was air, with a minimal effect on reducing flow efficiency.

The patentable embodiments of the above-described invention claimed are as follows:

1. In apparatus for creating vertical circulation within a standing body of liquid, the apparatus comprising a substantially linearly extending stackpipe having a substantially constant nominal diameter ("D") and designed to be fully submerged in a longitudinally vertical orientation, within the standing body of liquid, the stackpipe having an upper discharge opening and a lower inlet opening; flow-generating means comprising a gas bubble generator in fluid-flow connection with the interior of the stackpipe and means for delivering gas under pressure to the bubble generator for passage into the stackpipe at a location and entraining in the liquid therein; the improvement comprising upper diversion means, in fluid-flow connection with the upper discharge opening of the stackpipe and designed to laterally divert a flow of liquid and entrained gas bubbles from the stackpipe into a substantially horizontal direction adjacent the upper surface of the liquid; flow-limiting means designed to prevent the vertically moving liquid-and-gas bubble flow from reaching the surface of the body of liquid and extending horizontally outwardly from the stackpipe; and gas discharging and collecting means, in fluid-flow connection with the flow-limiting means and designed to collect and discharge entrained gas bubbles to a space above the top surface of the body of liquid, the collecting means comprising a conduit having an inlet opening located below the surface of the body of liquid and in direct fluid-flow contact with the flow-limiting means, and having a discharge opening located above the surface of the body of liquid, the space between the inlet opening and the discharge opening being otherwise completely enclosed.

2. The apparatus of claim 1 wherein the gas bubble generator is designed to inject into the stackpipe individual bubbles of a volume sufficient to extend substantially wholly across the diameter of the stackpipe.

3. The apparatus of claim 1 comprising at least two horizontal limiting conduits extending outwardly from the stackpipe and means for placing in fluid-flow connection each of the horizontal conduits to the stackpipe.

4. The apparatus of claim 2 wherein the diversion means and the flow-limiting means comprise at least one conduit including a substantially horizontal flow-limiting portion extending outwardly away from the stackpipe and a connecting portion in fluid-flow connection between the stackpipe and the flow-limiting portion providing a substantially 90° bend therebetween, and further wherein the gas discharging and collecting means comprises an upwardly extending snorkel release pipe, in fluid-flow connection with the horizontal conduit and extending upwardly to above the top surface of the standing body of liquid and having a discharge opening located above said top surface.

5. The apparatus of claim 4 wherein the snorkel discharge pipe extends upwardly at an angle of at least about 45° above the horizontal.

6. The apparatus of claim 5 wherein the snorkel pipe is offset from the stackpipe a horizontal distance equal to at least about $\frac{1}{2}$ the diameter of the stackpipe and not greater than about twice the diameter of the stackpipe.

7. The apparatus of claim 5 wherein the discharge opening from the horizontal discharge conduit is located at a distance from the downstream edge of the inner circumference of the snorkel pipe of at least about twice the diameter of the stackpipe and not greater than about four times the diameter of the stackpipe.

8. The apparatus of claim 1 wherein the diversion means comprises a horizontal flow spreader plate supported substantially directly above the stackpipe discharge opening and wherein the gas discharging and collecting means comprises a laterally extending air collection hood supported substantially directly above and concentric with the flow spreader plate, the air collection hood comprising an annular laterally extending plate member having a central opening and a vertically extending conduit secured to the central opening of the air collection hood and extending upwardly therefrom and a discharge opening from the vertical conduit designed to be located above the top surface of the standing body of liquid.

9. The apparatus of claim 8 wherein the flow spreader plate is concentric with the stackpipe.

10. The apparatus of claim 9 wherein the air collection hood diverges downwardly at an angle of from about 1° to about 7° below the horizontal.

11. The apparatus of claim 9 wherein the vertical conduit is substantially concentric with the stackpipe.

12. The apparatus of claim 9 wherein the flow spreader plate is located above the stackpipe discharge opening a distance of at least about the diameter of the stackpipe and the air collection hood central surface is located above the flow spreader plate a distance equal to at least about the diameter of the stackpipe.

13. The apparatus of claim 9 wherein the flow spreader plate has a diameter equal to at least about twice the diameter of the stackpipe and wherein the air collection hood has a diameter equal to at least about twice the diameter of the flow spreader plate.

14. The apparatus of claim 9 wherein the discharge opening from the vertical conduit is located above the air collecton hood at a distance equal to at least about the diameter of the snorkel pipe and not greater than about 7 times the diameter of the snorkel pipe.

15. The apparatus of claim 9 wherein the flow spreader plate and the air collection hood are supported on the stackpipe by an open framework which permits flow of liquid from the stackpipe discharge opening in a horizontal direction outwardly into the standing body of liquid.

* * * * *